United States Patent
Ghosh et al.

(10) Patent No.: US 11,113,660 B2
(45) Date of Patent: Sep. 7, 2021

(54) DATABASE MODIFICATION FOR IMPROVED ON-SHELF AVAILABILITY DETERMINATION

(71) Applicant: Target Brands, Inc., Minneapolis, MN (US)

(72) Inventors: Debajit Ghosh, St. Paul, MN (US); Michael Halleckson, Arden Hills, MN (US)

(73) Assignee: Target Brands, Inc., Minneapolis, MN (US)

( * ) Notice: Subject to any disclaimer, the term of this patent is extended or adjusted under 35 U.S.C. 154(b) by 472 days.

(21) Appl. No.: 15/937,277

(22) Filed: Mar. 27, 2018

(65) Prior Publication Data

US 2019/0303863 A1 Oct. 3, 2019

(51) Int. Cl.
*G06Q 10/08* (2012.01)
*G06F 16/23* (2019.01)

(52) U.S. Cl.
CPC ..... *G06Q 10/0875* (2013.01); *G06F 16/2365* (2019.01); *G06F 16/2379* (2019.01)

(58) Field of Classification Search
CPC ......... G06Q 10/08; G06Q 30/02; G06Q 10/06
See application file for complete search history.

(56) References Cited

U.S. PATENT DOCUMENTS

| | | |
|---|---|---|
| 6,341,269 B1 | 1/2002 | Dulaney et al. |
| 7,240,027 B2 | 7/2007 | McConnell et al. |
| 7,373,321 B2 | 5/2008 | Collings et al. |
| 8,321,303 B1 | 11/2012 | Krishnamurthy et al. |
| 8,325,036 B1 | 12/2012 | Fuhr et al. |
| 8,577,136 B1 | 11/2013 | Ascher et al. |
| 8,650,100 B1 | 2/2014 | Miller et al. |
| 8,751,277 B2 | 6/2014 | Hong et al. |
| 9,280,757 B2 | 3/2016 | Parpia et al. |
| 10,552,789 B2* | 2/2020 | Lindberg ............. G06Q 10/087 |
| 2010/0138281 A1 | 6/2010 | Zhang et al. |
| 2015/0178672 A1 | 6/2015 | Jones et al. |
| 2015/0235157 A1 | 8/2015 | Avegliano et al. |
| 2017/0068973 A1 | 3/2017 | Sinkel |
| 2017/0161675 A1* | 6/2017 | Jones ............... G06Q 10/06311 |
| 2017/0193435 A1* | 7/2017 | Sarin .................. G06Q 30/0202 |
| 2017/0330139 A1* | 11/2017 | Jones ................... G06Q 10/087 |

OTHER PUBLICATIONS

Broekmeulen et al., Excess shelf space in retail stores: an analytical model and empirical assessment, https://www.researchgate.net/publication/254979624_Excess_shelf_space_in_retail_stores_An_analytical_model_and_empirical_assessment, 27 pages, 2004.

* cited by examiner

*Primary Examiner* — Olusegun Goyea
(74) *Attorney, Agent, or Firm* — Theodore M. Magee; Westman, Champlin & Koehler, P.A.

(57) ABSTRACT

A computer-implemented method includes identifying which retail items in a set of retail items have erroneous on-hands values stored in a database and removing the identified retail items from the set of retail items to form a sub-set of retail items. A nominal sales floor capacity stored in the database for the retail items in the sub-set of retail items are evaluated without evaluating the nominal sales floor capacity of the identified retail items. The nominal sales floor capacity stored in the database for at least one retail item is corrected based on evaluating the nominal sales floor capacity stored in the database.

5 Claims, 11 Drawing Sheets

DATABASE MODIFICATION FOR IMPROVED ON-SHELF AVAILABILITY DETERMINATION

BACKGROUND

Computer systems have been developed that attempt to track inventory in retail stores. One particular metric of interest is on-shelf availability (OSA), which indicates the percentage of time that at least one of an item was available for sale on the sales floor. However, computer systems have historically functioned poorly in generating such a metric and often create an erroneous OSA value. When the OSA value generated by the computer is larger than the actual sales floor availability, retail stores incur lost sales because more shoppers leave the store without finding the products they want. When the calculated OSA is smaller than the actual sales floor availability, the retail store wastes employee resources by unnecessarily restocking items.

The discussion above is merely provided for general background information and is not intended to be used as an aid in determining the scope of the claimed subject matter. The claimed subject matter is not limited to implementations that solve any or all disadvantages noted in the background.

SUMMARY

A computer-implemented method includes identifying which retail items in a set of retail items have erroneous on-hands values stored in a database and removing the identified retail items from the set of retail items to form a sub-set of retail items. A nominal sales floor capacity stored in the database for the retail items in the sub-set of retail items are evaluated without evaluating the nominal sales floor capacity of the identified retail items. The nominal sales floor capacity stored in the database for at least one retail item is corrected based on evaluating the nominal sales floor capacity stored in the database.

In accordance with a further embodiment, a method includes identifying a maximum net sales floor replenishment for a retail item during a period of time and modifying a nominal capacity for the retail item in a database so that the nominal capacity matches the maximum net sales floor replenishment. The modified nominal capacity is then used to count how often the retail item is unavailable on the sales floor.

In accordance with a still further embodiment, a system includes a qualification module that identifies retail items in a database that have on-hands values that qualify the retail items for on-shelf availability evaluation and a sales floor capacity correction module that corrects a nominal sales floor capacity for at least one retail item qualified for on-shelf availability evaluation. An on-shelf availability evaluation module determines an amount of on-shelf availability for the at least one retail item using the corrected nominal sales floor capacity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The present inventors have discovered that computing systems need to be improved in order to generate accurate on-shelf availability metrics. In particular, computer systems need to be improved to identify when a computer's database contains an incorrect value for the nominal capacity of an item on a retail sales floor. When the nominal capacity of an item stored in the database overstates the available capacity for the item on the sales floor, the sales floor is not able to accommodate as many units of the item as the computer expects. As a result, the sales floor can become devoid of the item when the computer believes there should still be remaining units of the item on the sales floor. When the nominal capacity understates the actual capacity, there are more units of the item on the sales floor than the computer expects. When this occurs, the computer will indicate that the sales floor is devoid of the item when in fact units of the item remain on the shelf.

To improve these computer systems, various embodiments first identify items that have been so poorly counted that correcting the nominal capacity automatically will not be possible. Once these items have been removed, the remaining items are evaluated to identify whether their nominal capacity should be increased, decreased, or left the same based on the number of sales of the items and how the items are moved within the store. Once the nominal capacities have been corrected, the on-shelf availability for each item is determined by starting from a time point when the item is most likely to have been fully stocked on the sales floor. By taking these steps, the present inventors have improved the computing system so that it can efficiently identify incorrect nominal capacities, correct those nominal capacities automatically and provide an improved on-shelf availability metric.

Figure 1:
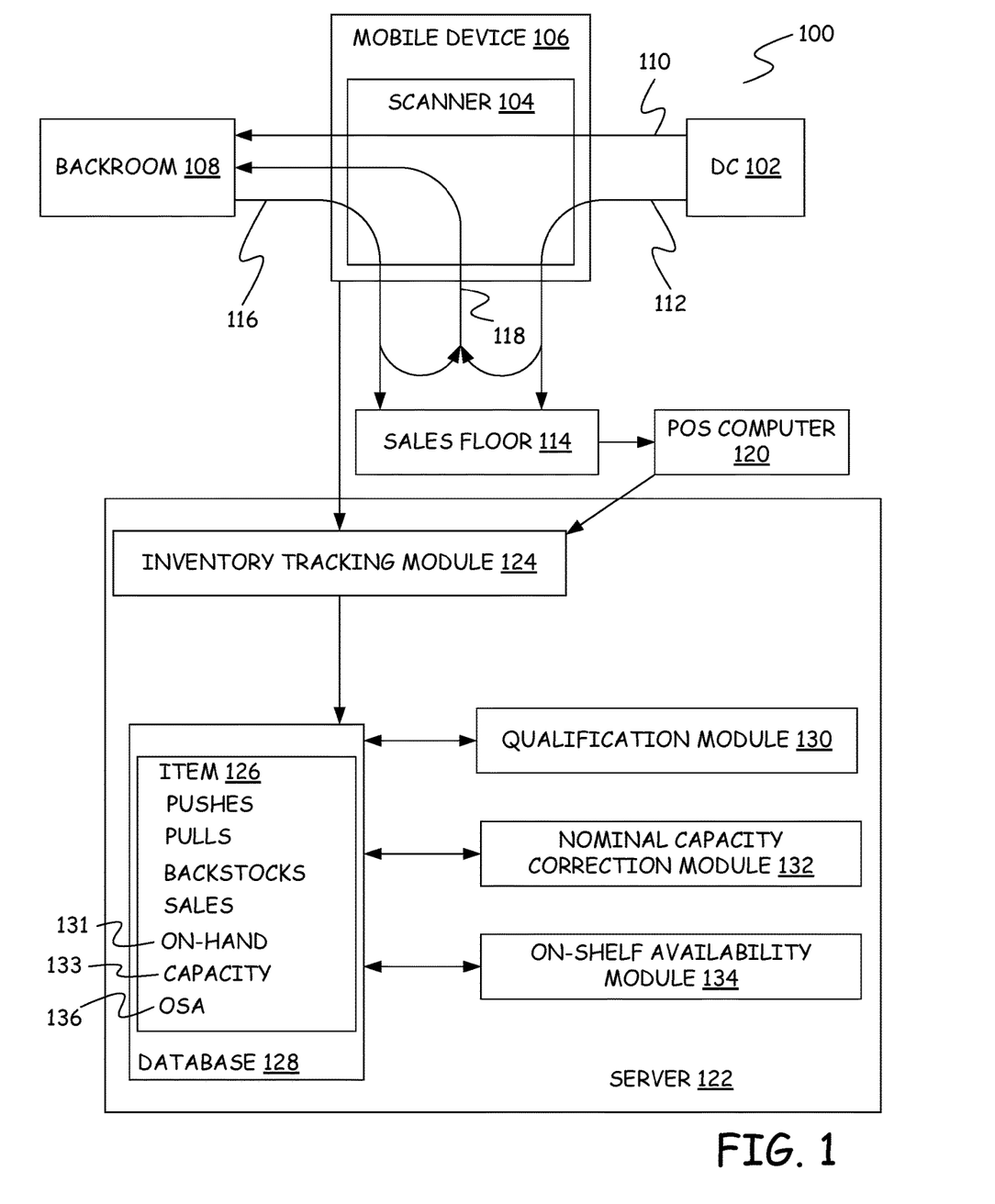
FIG. 1 is a plan view of an inventory system in accordance with one embodiment.

FIG. 1 provides a plan view of an inventory system 100 that tracks the movement of items into, around, and out of a retail store. The retail store can contain multiple units of a single item, where each unit of an item is considered to be the same as every other unit of the item. Each unit of an item can be separately purchased by consumers.

Units of items are initially sent to the store by a distribution center 102 and upon arriving at the store are scanned by a scanner 104, which can be mounted on a mobile device 106. A unit received from distribution center 102 can be placed directly into a backroom 108 of the retail store through a stocking operation 110 or placed directly on a sales floor 114 through a push operation 112. Items stocked in backroom 108 can later be taken from backroom 108 and placed on sales floor 114 through a pull operation 116. During a pull operation 116, the items are scanned by scanner 104 as they leave backroom 108. If an area on the sales floor that is to receive the units of an item is too full to accept all of the units scanned for a push operation 112 or a pull operation 116, the excess units can be rescanned as they are returned to backroom 108 during a back stock operation 118. For example, if an area on a display shelf only has room for ten units of an item and a push operation 112 sends fifteen units of the item to sales floor 114, five of the items will be sent to backroom 108 through a back stock operation 118. Units of items on sales floor 114 may be selected by a consumer and taken to a point-of-sale (POS) computer 120, which records the sale of the unit allowing the consumer to leave the store with the unit.

Each scan of a unit during a stocking operation 110, a push operation 112, a pull operation 116, and a back stock operation 118 is received by an inventory tracking module 124 in a server 122. This information can be sent between mobile device 106 and server 122 through any combination of wireless and/or wired networks. Inventory tracking module 124 also receives sales data from the POS computer 120 indicating when an item unit has been sold.

Inventory tracking module 124 records all of the inventory operation including stock operations 110, push operations 112, pull operations 116, back stock operations 110, and sales in an item entry 126 of a database 128. For each inventory operation, the date and time of the inventory operation and the count of the units involved in the operation are recorded. Item entry 126 also include an on-hand count 131 that is updated daily and is intended to provide a total count of the number of units in the store including the number of units in backroom 108 and the number of units on sales floor 114. Item entries 126 also include a nominal sales floor capacity 133 that represents the number of items that are expected to fit on sales floor 114.

Figure 2:
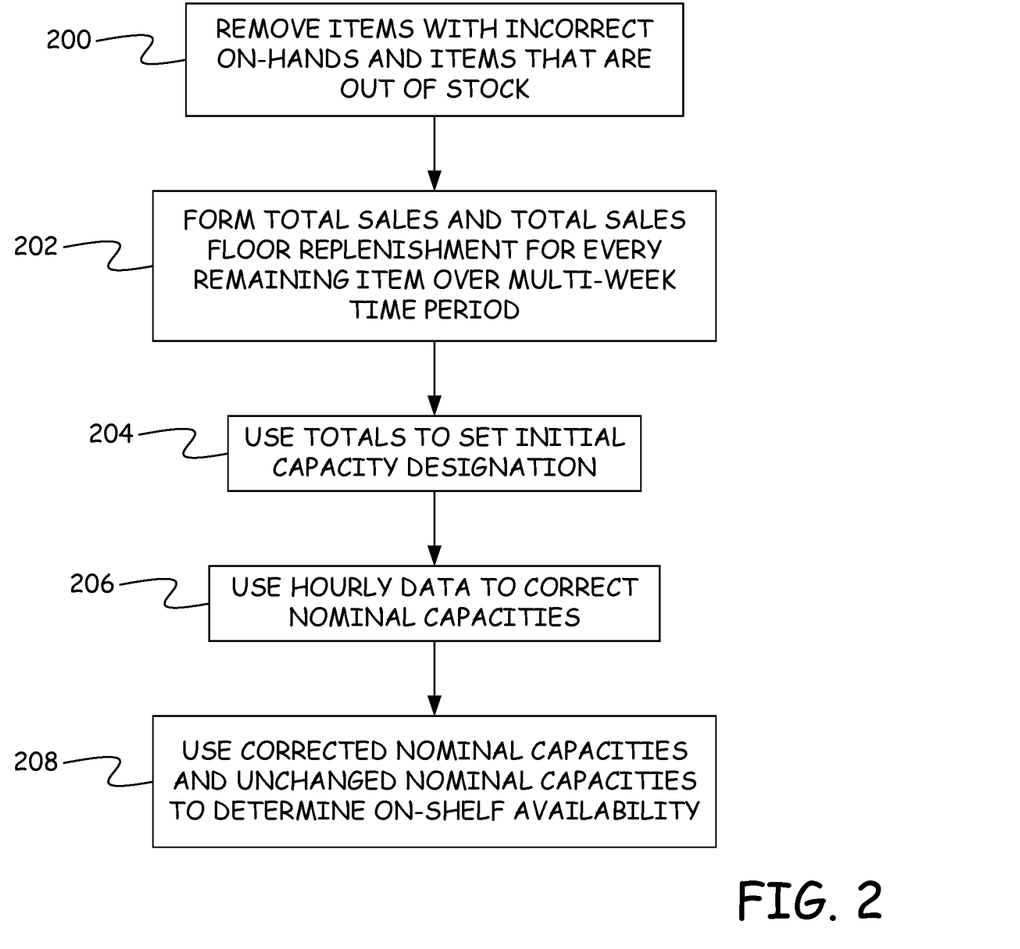
FIG. 2 is a flow diagram for determining on-shelf availability in accordance with one embodiment.

FIG. 2 provides a method for correcting the nominal capacity of items that have an incorrect nominal capacity and using the corrected nominal capacities to determine on-shelf availability. In step 200 of FIG. 2, a qualification module 130 removes items that have been so poorly tracked in the store that correcting their nominal capacity would not be possible using the techniques described below. In particular, items are removed that have incorrect on-hands values or that are out of stock. Thus, qualification module 130 takes a set of items stored in database 128 and removes some items to form a sub-set of items that are to be further evaluated to determine if their nominal capacity is correct.

Figure 3:
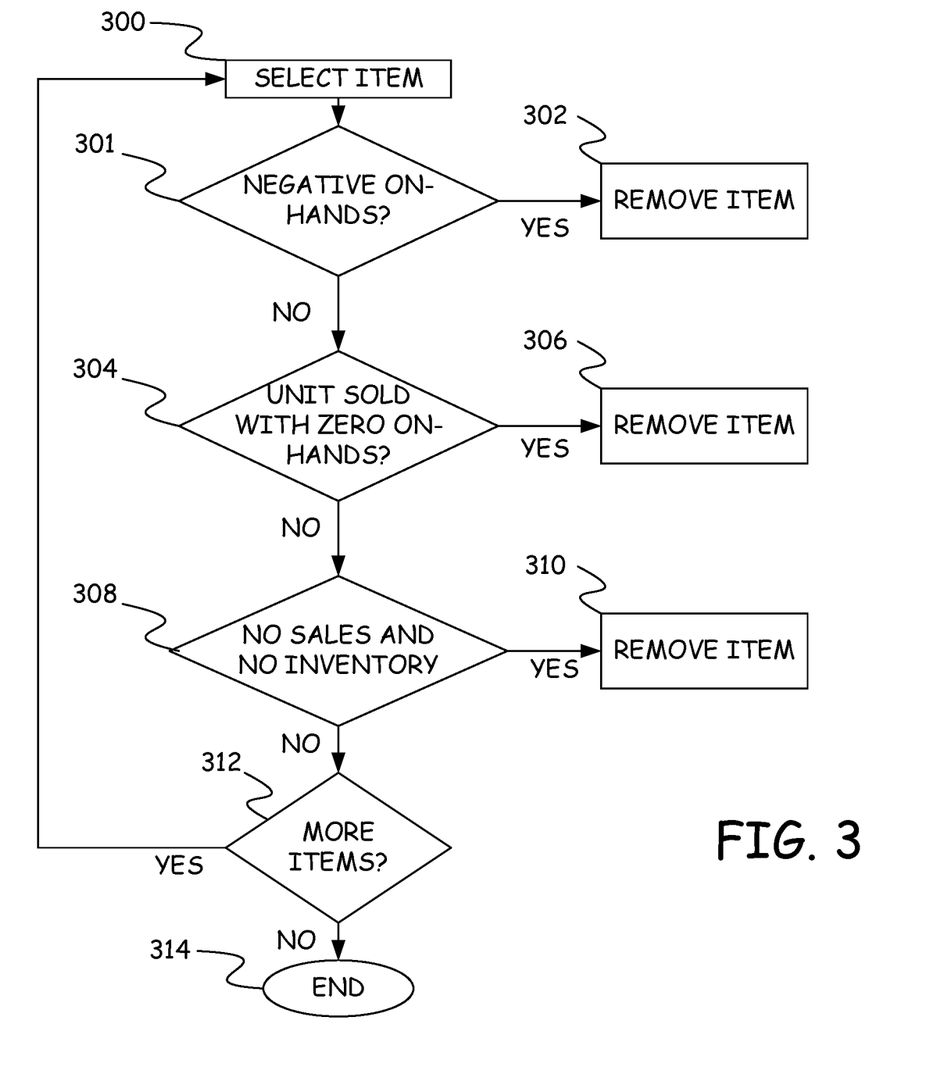
FIG. 3 is flow diagram of a method for qualifying items for determining on-shelf availability in accordance with one embodiment.

FIG. 3 provides a flow diagram of a method for removing such items in accordance with one embodiment.

At step 300 of FIG. 3, an item from the set of items listed in database 128 is selected. At step 301, the daily on-hands values 131 for the selected item over a past time period, such as six weeks, are examined. If any of the on-hands values are negative for any day, the item is removed from further consideration at step 302 because it is not possible to have a negative number of units in the retail store. At step 304, qualification module 130 determines if a unit of the item was sold when the previous day's on-hands value was zero. Such a sale is not possible if there were truly no units on-hand. Thus, the tracking of the item's inventory has not been performed well and the item is removed from further consideration at step 306. At step 308, qualification module 130 determines if the unit did not sell over the six week time period and the retail store did not have any units of the item in inventory over the six week time period. For such items, it is not possible to compute a correction for the nominal capacity and the item is removed from further consideration at step 310. At step 312, qualification module 130 determines if there are more items in database 128. If there are more items, the process returns to step 300 to select another item and steps 301-312 are repeated for the new item. When there are no more items in database 128, the process of FIG. 3 ends at step 314.

In accordance with some embodiments, each item that is removed in the process of FIG. 3 is flagged for an employee to investigate so as to correct the on-hands number or to remove the item from the computing system since it is no longer being sold. By removing items with erroneous on-hands values and items that are out of stock, the invention improves the efficiency of the computer in determining the correct nominal capacity for items in the store since the computer does not waste time attempting to correct the nominal capacity of items that are clearly being miscounted or are not present at all in the store.

Returning to FIG. 2, after items have been removed from further consideration at step 200, a nominal capacity correction module 132 evaluates a nominal sales floor capacity stored in the database for the retail items in the sub-set of retail items that were not removed without evaluating the nominal sales floor capacity of the retail items that were removed. In particular, at step 202, nominal capacity correction module 132 forms a total sales value and a total sales floor replenishment value for every remaining item in the sub-set of remaining items over a time period, such as six weeks. The nominal capacity correction module 132 then uses the total sales values and total sales floor replenishment vales to set an initial capacity designation at step 204.

Figure 4:
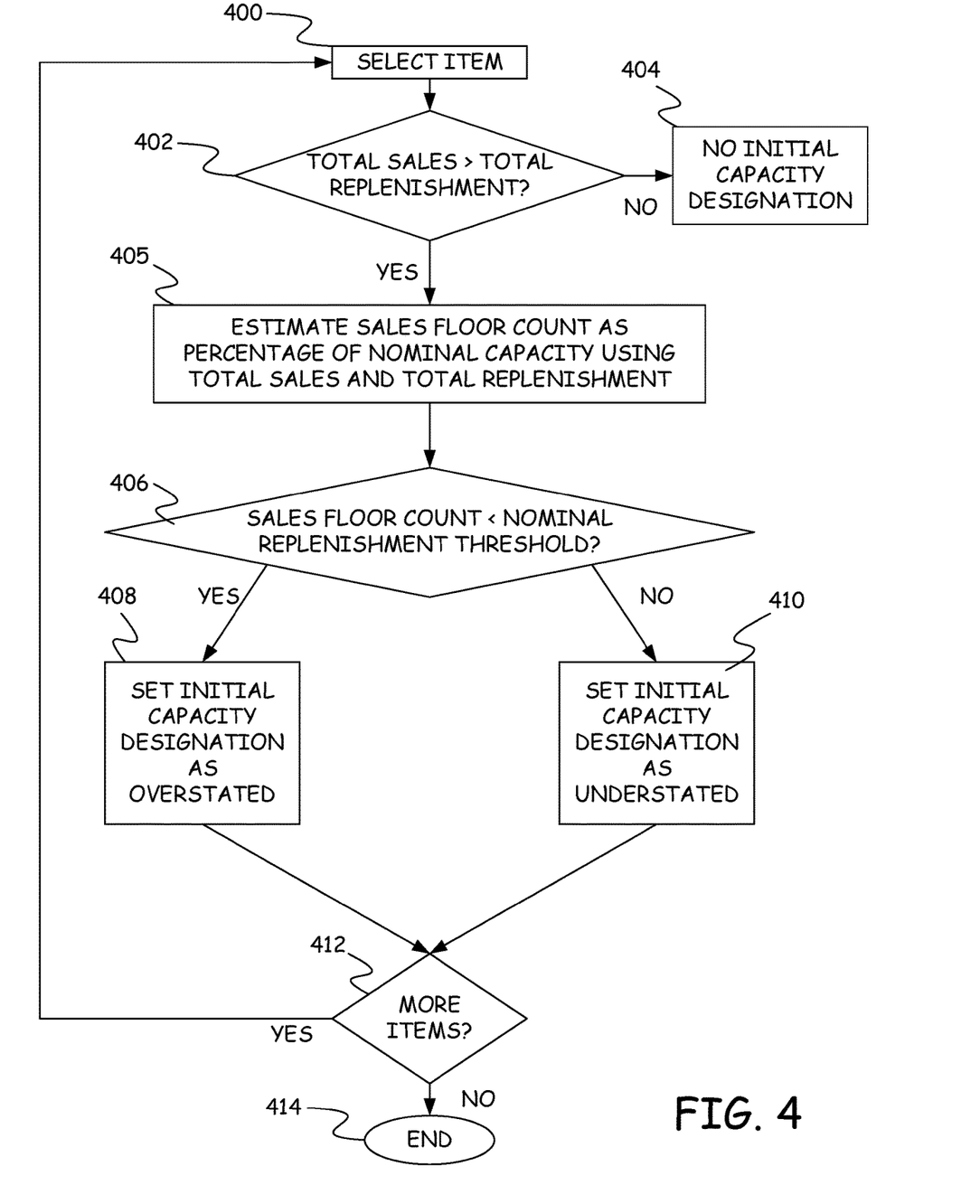
FIG. 4 is a flow diagram of a method of setting an initial capacity designation for an item in accordance with one embodiment.

FIG. 4 provides a flow diagram of a method for setting the initial capacity designation for items in the sub-set of remaining items in accordance with one embodiment. In step 400, one of the items that was not removed in step 200 is selected. At step 402, nominal capacity correction module 132 determines if the total sales are greater than the total replenishment. If the total sales are not greater than the total replenishment, no initial capacity designation is set at step 404. If the total sales are greater than the total replenishment at step 402, nominal capacity correction module 132 estimates a sales floor count for the item at step 405. In accordance with one embodiment, the sales floor count is estimated as a percentage of the nominal capacity for the item using the total sales, the total replenishment and the nominal capacity. In particular, the sales floor count is computed as the nominal capacity minus the total sales plus total replenishment divided by nominal capacity. Thus, the computation at step 405 assumes that the area of sales floor displaying the item was full at the beginning of the time period for the total sales and total replenishments.

At step 406, the sales floor count computed in step 405 is compared to a minimum replenishment threshold, which is also defined as a percentage of nominal capacity. In accordance with one embodiment, the minimum replenishment threshold is 30% of the nominal capacity. If the sales floor count is less than the nominal replenishment threshold at step 406, the initial capacity designation is set to indicate that the nominal capacity is overstating the actual capacity at step 408. If the sales floor count is greater than the nominal replenishment threshold, the initial capacity designation is set at step 410 to indicate that the nominal capacity understates the actual capacity.

Figure 5:
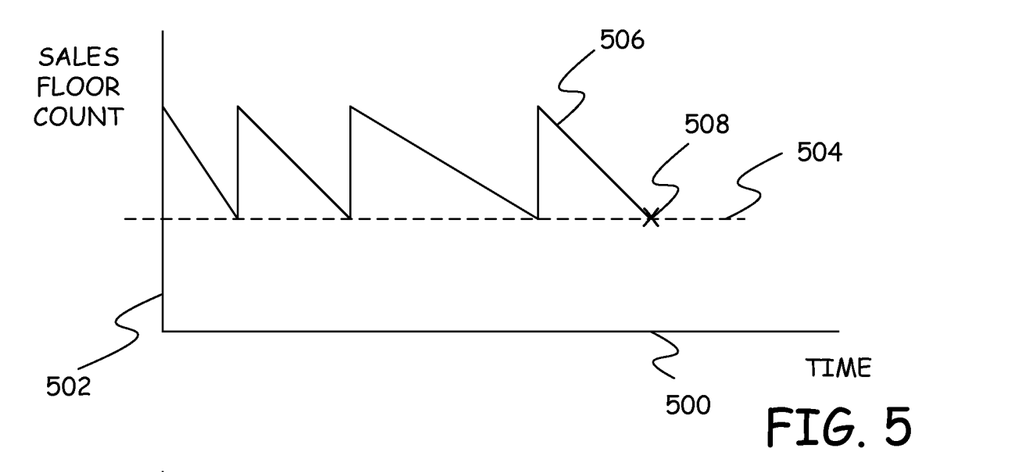
FIG. 5 is a graph of idealized sales floor restocking when the nominal capacity matches the actual capacity of the sales floor.
Figure 6:
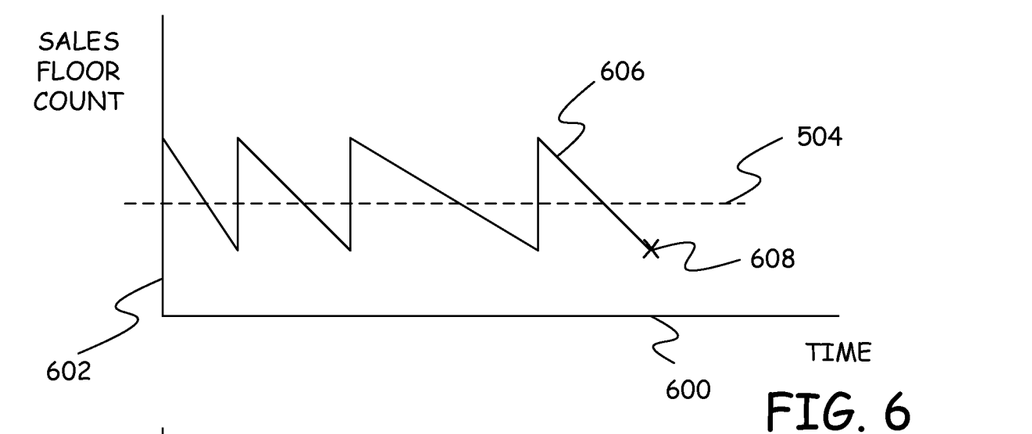
FIG. 6 is an example of idealized sales floor restocking when the nominal capacity overstates the actual capacity of the sales floor.
Figure 7:
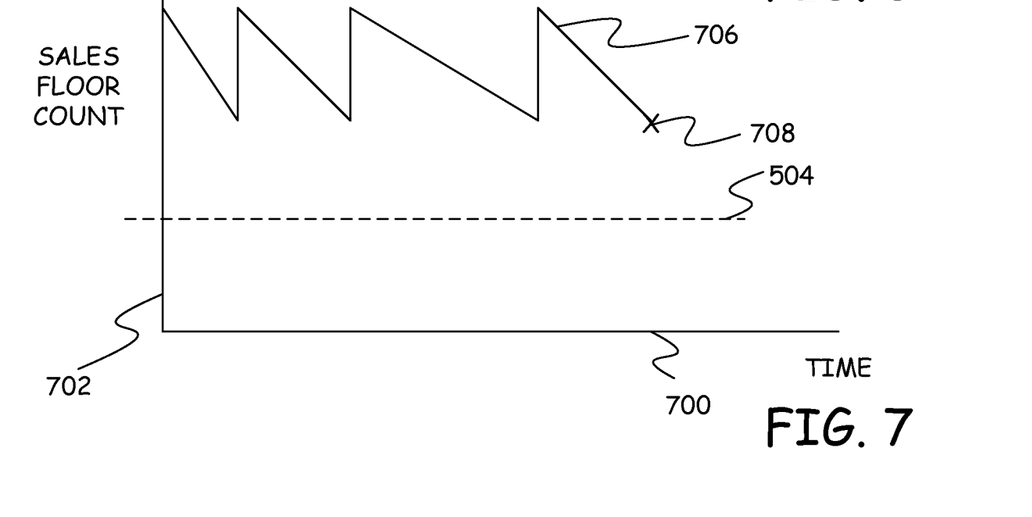
FIG. 7 is a graph of idealized sales floor restocking when the nominal capacity understates the actual capacity of the sales floor.

FIGS. 5, 6 and 7 provide graphs indicating the basis for the initial capacity designations. In particular, in FIGS. 5, 6 and 7, the threshold replenishment is assumed to be 30% of the display capacity. Further, the displays are assumed to be restocked based on a visual assessment by a person so that the person will restock the displays as soon as the displays reach 30% of their actual capacity. In FIG. 5, a graph 506 of the sales floor count for a display that has the nominal capacity is shown with time on horizontal axis 500 and the count of items on the sales floor shown on vertical axis 502. The threshold replenishment count for the nominal capacity is shown by horizontal line 504. Graph 506 shows that the count decreases until reaching the threshold count at which point it is increased through replenishment. At the end of the six week period, the shelf count has reached a value 508 that is equal to the replenishment threshold count.

In FIG. 6, graph 606 provides a sales floor count when the nominal capacity overstates the actual capacity of a sales floor display with time shown along horizontal axis 600 and the sales floor count shown along vertical axis 602. When the nominal capacity overstates the actual capacity, the display is restocked at a much lower level than nominal replenishment threshold count 504. As a result, the sales floor count of FIG. 6 ends at a point 608 that is less than nominal replenishment threshold count 504. Thus, graph 606 of FIG. 6 corresponds to when the sales floor count is less than the nominal replenishment threshold at step 406 of FIG. 4 indicating that the nominal capacity overstates the actual capacity.

FIG. 7 provides a graph 706 of a sales floor count when the nominal capacity understates the actual capacity with time shown along horizontal axis 700 and the sales floor count shown along vertical axis 702. Because the nominal capacity understates the actual capacity, the sales floor display area will be restocked when it reaches the replenishment threshold of the actual capacity, which is above replenishment threshold of the nominal capacity. As a result, at the end of the six week period, the shelf will contain a count 708 that is greater than the nominal replenishment threshold 504. This corresponds to the sales floor count being greater than the nominal replenishment threshold at step 406 of FIG. 4 resulting in the setting of the initial capacity designation as understated at step 410.

In the discussion of graphs 5, 6 and 7 above, it is assumed that each of the sales floor display areas reaches their minimum capacity at the end of the six week period. Since the sales floor display areas are not guaranteed to reach their minimum at the end of any given period, the initial capacity designations formed using the assumptions shown in FIGS. 5-7 are not deterministic but instead provide additional information that is used below when determining whether to adjust the nominal capacity for an item.

Returning to FIG. 4, after the initial capacity designation is set at either step 408 or 410, the process determines if there are more items to be processed at step 412. If there are more items, the process returns to step 400 and a new item is selected and steps 402-412 are repeated. When all the items have been processed, the process ends at step 414.

Figure 8:
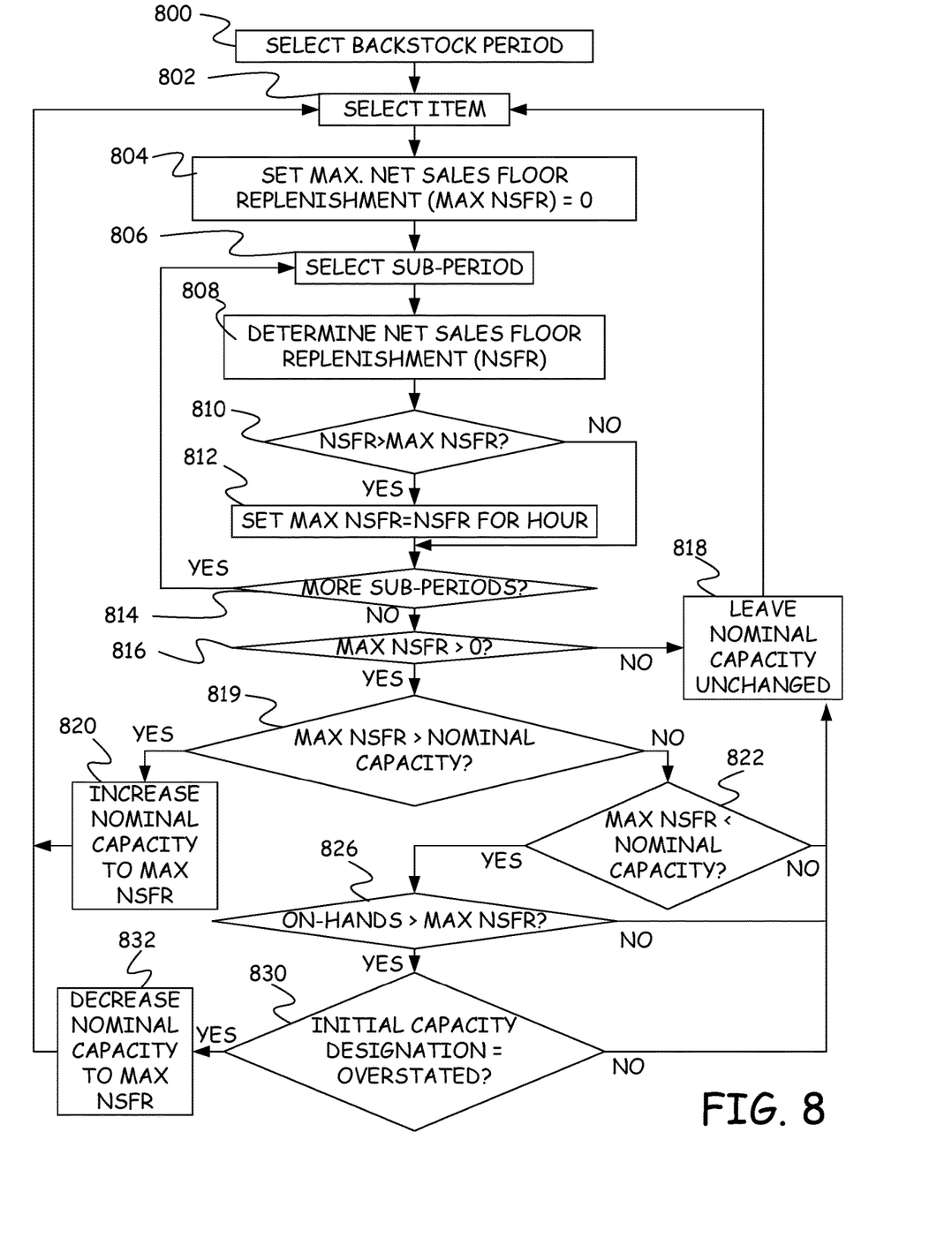
FIG. 8 is a flow diagram for correcting the nominal capacity for a sales floor in accordance with one embodiment.

Returning to FIG. 2, after the initial capacity designations have been set, nominal capacity correction module 132 uses hourly data to correct the nominal capacities. FIG. 8 provides a flow diagram of a method of correcting nominal capacities in accordance with one embodiment.

At step 800 of FIG. 8, a back stock period is selected. The back stock period is a period of time after a current time point during which back stock operations 118 will be included in determining a net sales floor replenishment for the current time point. For example, if the back stock period is set to six hours, the net sales floor replenishment calculated for 1:00-2:00 p.m. will include any back stock operations that occur between 1:00 p.m. and 7:00 p.m. Thus, the net sales floor replenishment is calculated for back stock operations that take place during the current sub-period and at least one subsequent sub-period. The calculation of net sales floor replenishment is discussed further below.

At step 802, an item in the set of items remaining after items are removed at step 200 is selected. At step 804, the maximum net sales floor replenishment for the item (MAX NSFR) is set to zero. At step 806, a sub-period, such as an hour, within a larger time period, such as six weeks in some embodiments, is selected. At step 808, the net sales floor replenishment (NSFR) for the selected sub-period is calculated. In accordance with one embodiment, the net sales floor replenishment is calculated as the number of units provided to the sales floor through push operations 112 during the sub-period plus the number of units of the item provided to the sales floor though pull operations 116 during the sub-period minus the number of units sent to the backroom though back stock operations 118 during the selected back stock period. By allowing the back stock operations to be included if they occur at any time during the back stock period, the various embodiments more accurately capture the number of units replenished to the sales floor in any given sub-period. Specifically when employees return items to the backroom 108 during the sub-period but delay scanning the items as being in backroom 108 due to other more pressing tasks that the employee must perform, the embodiment still captures that the units were removed from the sales floor during the sub-period. Thus, by using a longer back stock period than the sub-period, the various embodiments improve the computer system by providing a more accurate depiction of the actual net sales floor replenishment at any given sub-period.

At step 810, nominal capacity correction module 132 determines if the net sales floor replenishment for the sub-period is greater than the maximum net sales floor replenishment. If the net sales floor replenishment for the sub-period is greater than the maximum, the maximum net sales floor replenishment is set to the net sales floor replenishment for the current sub period at step 812. After step 812 or if the net sales floor replenishment is not greater than the maximum net sales floor replenishment, nominal capacity correction module 132 determines if there are more sub-periods in the longer time period at step 814. If there are more sub-periods, the next sub-period is selected by returning to step 806 and steps 810, 812 and 814 are repeated for the newly selected sub-period.

When all of the sub-periods have been processed at step 814, nominal capacity correction module 132 determines if the maximum net sales floor replenishment is greater than zero at step 816. If the maximum net sales floor replenishment is not greater than zero, then no units of the item were replenished on the sales floor during the time period. Without such replenishment, it is not possible to correct the nominal capacity if it is incorrect. As such, the nominal capacity is left unchanged at step 818.

If the maximum net sales floor replenishment is greater than zero at step 816, nominal capacity correction module 132 determines if the maximum net sales floor replenishment is greater than the nominal capacity at step 819. If the maximum net sales floor replenishment is greater than the nominal capacity, the nominal capacity 133 in database 128 is increased to the maximum net sales floor replenishment at step 820.

Figure 9:
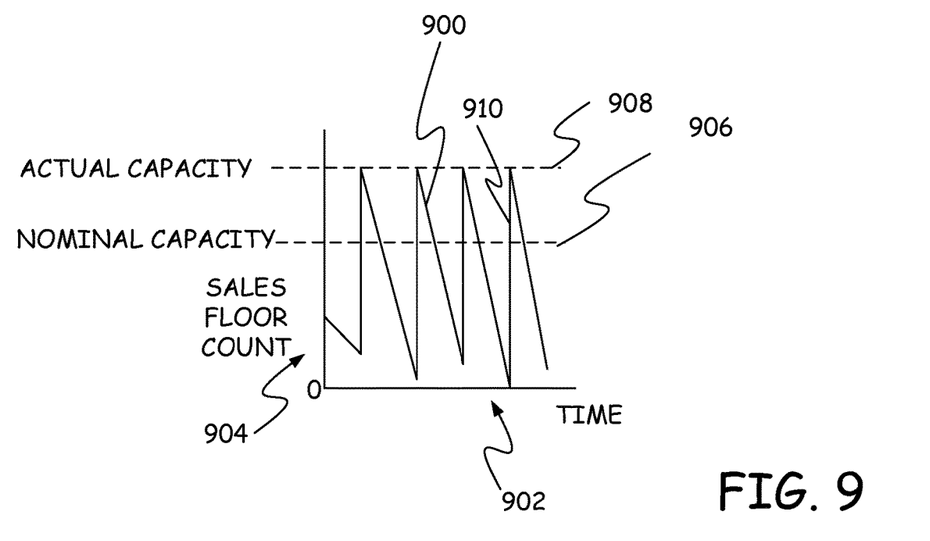
FIG. 9 is a graph showing an example of actual restocking when the nominal capacity understates the actual capacity.

The nominal capacity is increased at step 820 because the nominal capacity is understating the actual capacity of the sales floor. FIG. 9 provides a sales floor count graph 900 that explains why the nominal capacity should be increased to the maximum net sales floor replenishment in step 820. In FIG. 9, time is shown along horizontal axis 902 and the sales floor count, representing the number of items on the sales floor, is shown on vertical axis 904. In FIG. 9, the nominal capacity is shown by line 906 and the actual capacity is shown by line 908. If the nominal capacity correctly reflected the actual capacity, the maximum net sales floor replenishment possible would be the nominal capacity. However, since the nominal capacity 906 understates the actual capacity 908, the maximum net sales floor replenishment, represented by vertical line 910 of graph 900, is much larger than the nominal capacity, represented by the distance between the horizontal axis and horizontal line 906. As such, increasing the nominal capacity to the maximum net sales floor replenishment at step 820 produces a nominal capacity that is closer to or equal to the actual capacity represented by horizontal line 908. Note that in the example of FIG. 9, the maximum net sales floor replenishment occurred when the sales floor count drop to zero. However, in other instances, the maximum net sales floor replenishment may occur while there are still units of the item on the sales floor. In such circumstances, increasing the nominal capacity to the maximum net sales floor replenishment will increase the accuracy of the nominal capacity but will not provide a completely accurate nominal capacity. Nonetheless, by improving the accuracy of the nominal capacity, even though the nominal capacity is not completely accurate, the embodiments will improve the accuracy of the on-shelf availability metric.

Returning to the method of FIG. 8, if the maximum net sales floor replenishment is not greater than the nominal capacity at step 819, nominal capacity correction module 132 determines if the maximum net sales floor replenishment is less than the nominal capacity at step 822. If the maximum net sales floor replenishment is not less than the nominal capacity at step 822, the maximum net sales floor replenishment must be equal to the nominal capacity. This means that the nominal capacity is likely accurate and the nominal capacity is left unchanged at step 818. If the maximum net sales floor replenishment is less than the nominal capacity at step 822, the process determines if the on-hands value for the day is greater than the maximum net sales floor replenishment at step 826. If the on-hands value for the beginning of the day was not greater than the maximum net sales floor replenishment, the store may not have had enough units of the item to fully restock the sales floor. As a result, the maximum net sales floor replenishment cannot be used to change the nominal capacity and the nominal capacity is left unchanged at step 818.

At step 830, the nominal capacity correction module 132 determines if the initial capacity designation was set to overstated. If the initial capacity designation was not set to overstated, the nominal capacity is left unchanged at step 818. If the initial capacity designation was set to overstated, the nominal capacity 133 in database 128 is decreased to the maximum net sales floor replenishment at step 832. The nominal capacity is decreased at step 832 because the nominal capacity is considered to overstate the actual capacity.

Figure 10:
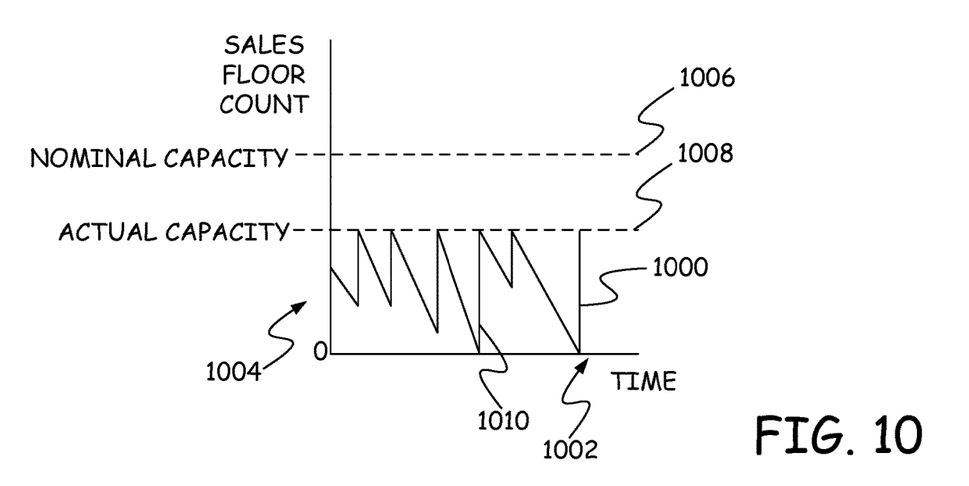
FIG. 10 is a graph of actual restocking when the nominal capacity overstates the actual capacity.

The reason for changing the nominal capacity to the maximum net sales floor replenishment in step 832 can be seen in graph 1000 of FIG. 10, which provides the sales floor count for an item when the nominal capacity overstates the actual capacity. In FIG. 10, time is shown along horizontal axis 1002 and the sales floor count is shown along vertical axis 1004. Nominal capacity is shown by horizontal line 1006 and the actual capacity is shown by horizontal line 1008. Because the nominal capacity overstates the actual capacity, replenishment of the sales floor is not able to fill the sales floor display area to the nominal capacity but instead is only able to fill the sales floor display area to the actual capacity shown by line 1008. As a result, during a maximum net sales floor replenishment, the maximum number of units that can be flowed to the sales floor is the actual capacity. Thus by identifying a maximum net sales floor replenishment, shown by vertical line 1010 of graph 1000, and using that maximum net sales floor replenishment as the new nominal capacity, the embodiments set the nominal capacity to more accurately reflect the actual capacity. Note that in FIG. 10, the maximum net sales floor replenishment 1010 occurs when the sales floor count reaches zero. Such an occurrence cannot be guaranteed for all items and it is possible that the maximum net sales floor replenishment will occur for an item while there are still units of the item on the sales floor. Nonetheless, changing the nominal capacity to the maximum net sales floor replenishment will shift the nominal capacity to a value that is closer to the actual capacity thereby improving the on-shelf availability metric.

After steps 818, 820 or 832, the process of FIG. 8 returns to step 802 to select another item from the set of items remaining after step 200 of FIG. 2. The steps of FIG. 8 are then repeated for the newly selected item. This process is repeated until all of the items in the set of items remaining after step 200 have been processed.

Returning to the method of FIG. 2, after nominal capacities have been corrected at step 206, an on-shelf availability module 134 uses the corrected nominal capacities and the unchanged nominal capacities to determine on-shelf availability of items in the retail store at step 208. Although the term "on-shelf" is used, those skilled in the art will recognize that on-shelf availability refers to the availability of the item on the sales floor regardless of the display apparatus used to support the item on the sales floor.

Figure 11:
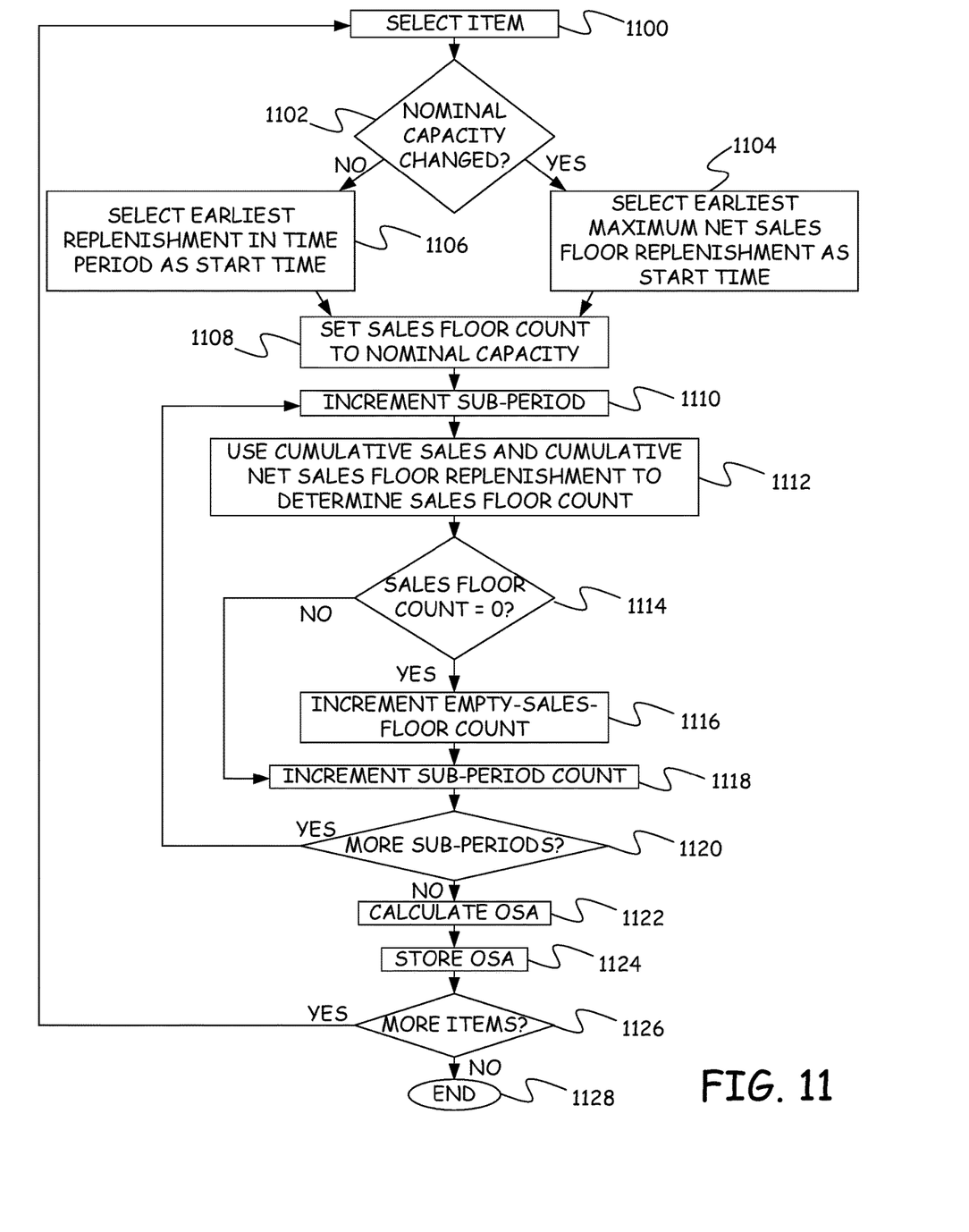
FIG. 11 is a flow diagram of a method of determining on-shelf availability in accordance with one embodiment

FIG. 11 provides a flow diagram of a method for determining on-shelf availability in accordance with one embodiment. At step 1100 of FIG. 11, an item is selected from the set of items remaining after filtering step 200. Thus, the steps involved in determining on-shelf availability are not determined for those items that qualification module 130 determined were so poorly tracked in the store that an accurate on-shelf availability could not be computed. As a result, the computer used in the present embodiments is improved since it does not waste time trying to compute an on-shelf availability for items that have been too poorly tracked to provide an accurate on-shelf availability.

At step 1102, on-shelf availability module 134 determines if the nominal capacity was changed by capacity correction module 132. If the nominal capacity was changed, on-shelf availability module 134 selects the earliest maximum net sales floor replenishment as a start time for determining on-shelf availability at step 1104. By shifting the start time for determining on-shelf availability to the earliest maximum net sales floor replenishment, the embodiment of FIG. 11 removes sales floor counts that occurred before the nominal capacity was corrected. This removes data that may be associated with a different actual capacity on the sales floor. For example, before the earliest maximum net sales floor replenishment, the sales floor may have had a larger or smaller actual capacity. However, after the maximum net sales floor replenishment, the actual capacity is considered to be constant and is considered to be more closely represented by the maximum net sales floor replenishment than by the previous nominal capacity.

Figure 12:
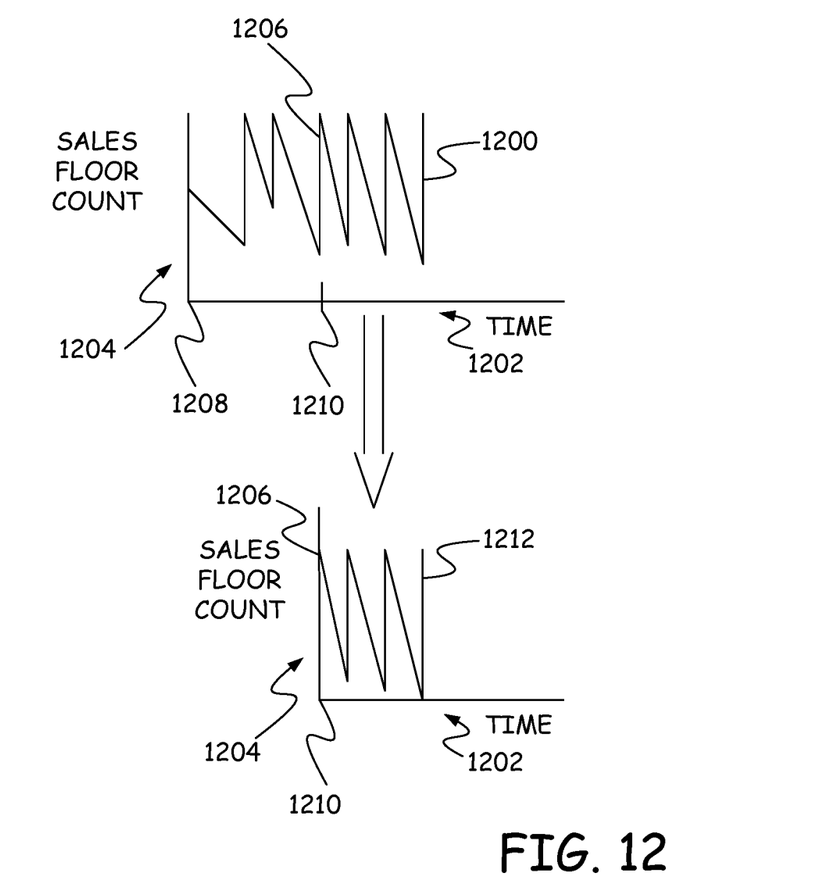
FIG. 12 shows the selection of a starting time point and sales floor count for counting empty sales floor events when the nominal capacity has been corrected in accordance with one embodiment.

Selecting the earliest maximum net sales floor replenishment as the start time is reflected in the graphs of FIG. 12 where graph 1200 provides the sales floor count starting from a time 1208 on horizontal axis 1202 with the sales floor count shown on vertical axis 1204. The earliest maximum net sales floor replenishment is shown as vertical line 1206 of graph 1200 and occurs at time 1210. Graph 1212 shows the sales floor count after time 1210 of the earliest maximum net sales floor replenishment has been selected as the new start time.

Figure 13:
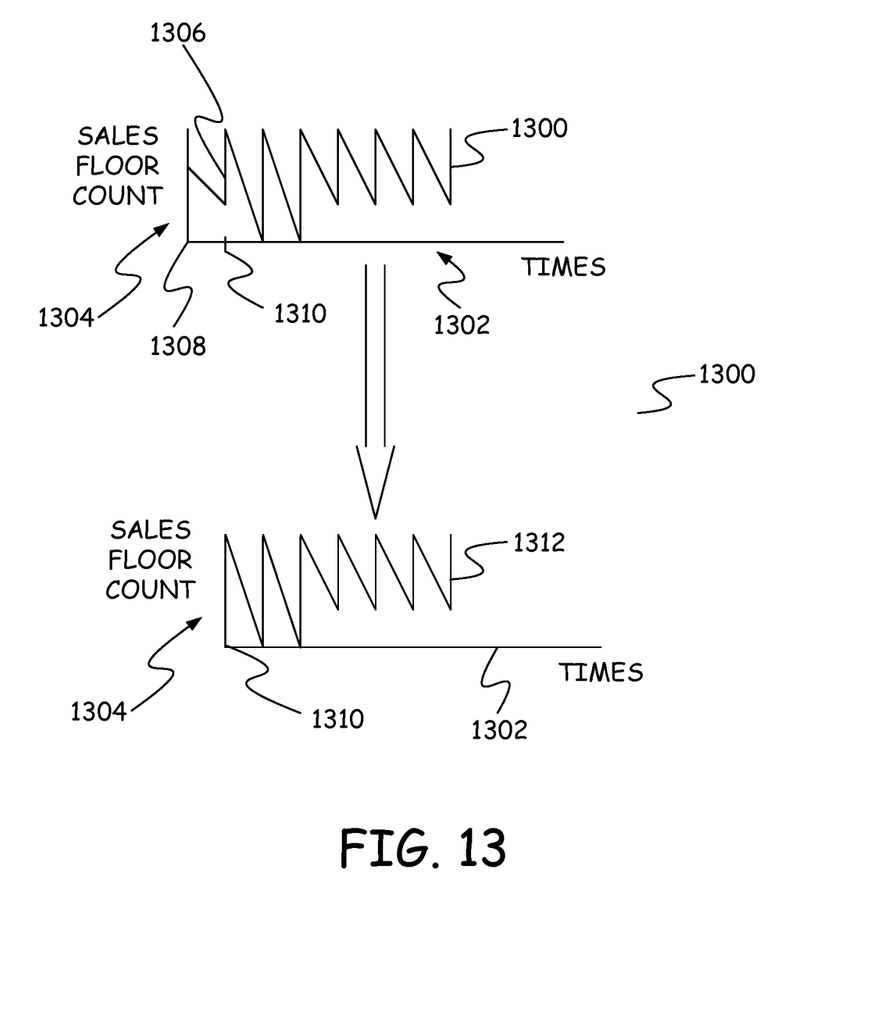
FIG. 13 provides graphs for selecting a starting time point and sales floor count for determining empty sales floor events when the nominal capacity has not been corrected in accordance with one embodiment.

If the nominal capacity was not changed in step 1102, the earliest replenishment in the time period is selected as the start time at step 1106. The graphs of FIG. 13 show the selection of an earliest replenishment as the start time when the nominal capacity was not changed. In particular, graph 1300 shows the sales floor count beginning at a time 1308 on horizontal axis 1302 with the sales floor count shown on vertical axis 1304. In graph 1300, the earliest replenishment is shown by vertical line 1306. In graph 1312, the start time has been shifted from time 1308 to time 1310 when the earliest replenishment 1306 occurred.

After the start times have been set, the initial sales floor count at the start times is set to the nominal capacity at step 1108. In the graphs of FIG. 12, this is depicted as a downward shift in graph 1200 to graph 1212 because the nominal capacity had been changed. In FIG. 13, since the nominal capacity was not changed, there is no vertical shift between graphs 1300 and 1312.

After the sales floor count has been set to the nominal capacity for the new start time at step 1108, the sub-period is incremented from the start time at step 1110. In accordance with one embodiment, each sub-period is an hour. On-shelf availability module 134 then updates cumulative sales and cumulative net sales floor replenishment for the new sub-period. The cumulative sales represents all sales that have occurred from the start time to the current sub-period and the cumulative net sales floor replenishment represents the total net sales floor replenishments that have occurred from the start time to the current sub-period. On-shelf availability module 134 then uses the cumulative sales and cumulative net sales floor replenishment to calculate the current sales floor count for the sub-period at step 1112. In accordance with one embodiment, the current sales floor count is calculated by subtracting the cumulative sales from the nominal capacity and then adding the cumulative net sales floor replenishment.

At step 1114, on-shelf availability module 134 determines if the sales floor count determined in step 1112 is equal to zero. If the sales floor count is equal to zero, the empty-sales-floor count is incremented by one at step 1116. If the sales floor count is not equal to zero, or after the empty-sales-floor count has been incremented at step 1116, the sub-period count is incremented at step 1118. At step 1120, on-shelf availability module 134 determines if there are more sub-periods in the current time period. If there are more sub-periods, the process returns to step 1110 to increment the sub-period and steps 1112, 1114, 1116, 1118 and 1120 are repeated. When all of the sub-periods have been processed at step 1120, the on-shelf availability is calculated for the item at step 1122. In accordance with one embodiment, the on-shelf availability is calculated as one minus (empty-sales-floor count/sub-period count). In such embodiments, the on-shelf availability represents the percentage of time that at least one unit of the item was available on the sales floor. The sub-periods used in the method of FIG. 11 may be hours, days, or weeks.

At step 1124, on-shelf availability module 134 stores the on-shelf availability 136 for the item in database 128. At step 1126, on-shelf availability module 134 determines if there are more items. If there are more items, a new item is selected by returning to step 1100 and steps 1102-1126 are repeated for the new item. When all the items have been processed, the method of FIG. 11 ends at step 1128.

Figure 14:
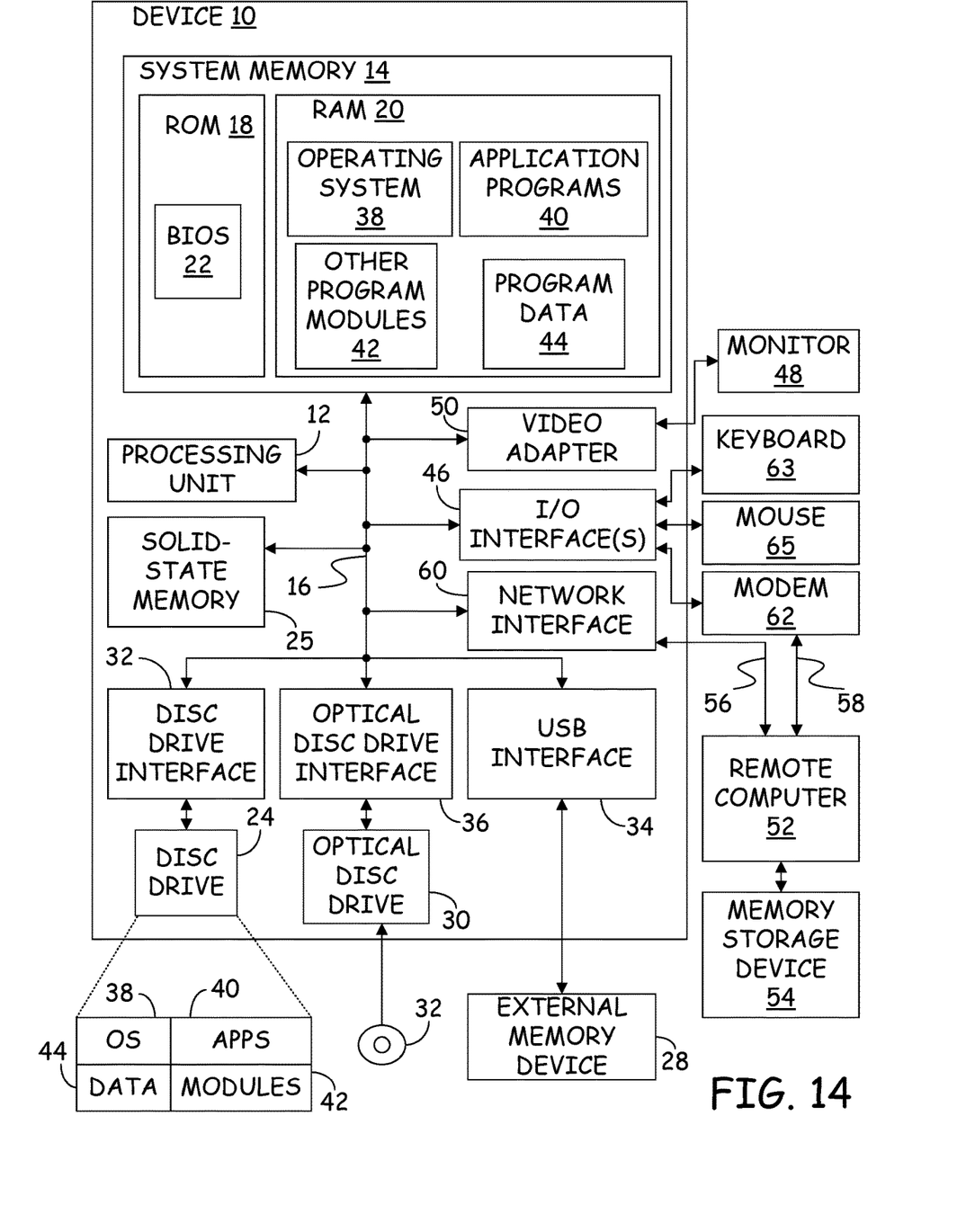
FIG. 14 is a block diagram of a computing device in accordance with various embodiments.

FIG. 14 provides an example of a computing device 10 that can be used as server 122 in the embodiments above. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes an optional hard disc drive 24, an optional external memory device 28, and an optional optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing any one of inventory tracking module 124, qualification module 130, nominal capacity correction module 132, and on-shelf availability module 134, for example. Program data 44 may include data such as item entries 126 of database 128, for example.

Processing unit 12, also referred to as a processor, executes programs in system memory 14 and solid state memory 25 to perform the methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 14. The network connections depicted in FIG. 14 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 14 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A method comprising:
   identifying, based on movements of a retail item within a store, a maximum net sales floor replenishment for the retail item during a first period of time;
   determining, by a processor, whether a hands-on count of the retail item has ever been negative during a second period of time;
   when the hands-on count has been negative during the second period of time, determining by the processor, that the nominal capacity is incapable of being automatically corrected; and
   when the hands-on count has not been negative during the second period of time:
   automatically determining, by the processor, that a nominal capacity for the retail item set in a database is incorrect based on the maximum net sales floor replenishment, and automatically modifying, by the processor, the incorrect nominal capacity for the retail item in the database so that the modified nominal capacity matches the maximum net sales floor replenishment; and
   using, by the processor, the modified nominal capacity to count how often the retail item is unavailable on the sales floor.

2. The method of claim 1 wherein identifying a maximum net sales floor replenishment comprises:
   for each sub-period during the period of time:
      determining a count of the number of units of the retail item that were brought to the sales floor during the sub-period;
      determining a count of the number of units of the retail item that were sent to a backroom during the sub-period and at least one sub-period after the sub-period; and
      subtracting the count of the number of units of the retail item that were sent to the backroom from the count of the number of units of the retail item that were brought to the sales floor to determine a net sales floor replenishment for the sub-period;
   selecting the largest net sales floor replenishment of any of the sub-periods as the maximum net sales floor replenishment.

3. The method of claim 1 wherein using the modified nominal capacity to count how often the retail item is unavailable on the sales floor comprises starting the count from an earliest maximum net sales floor replenishment during the period of time.

4. The method of claim 1 wherein modifying the nominal capacity comprises increasing the nominal capacity.

5. The method of claim 1 wherein modifying the nominal capacity comprises decreasing the nominal capacity.

* * * * *